(12) United States Patent
Deb et al.

(10) Patent No.: US 10,066,604 B2
(45) Date of Patent: Sep. 4, 2018

(54) METHOD AND SYSTEM FOR HYBRID WIND POWER GENERATION

(71) Applicant: General Electric Company, Schenectady, NY (US)

(72) Inventors: Dipankar Deb, Karnataka (IN); Akshay Krishnamurty Ambekar, Karnataka (IN); Deepak Raj Sagi, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 183 days.

(21) Appl. No.: 14/709,505

(22) Filed: May 12, 2015

(65) Prior Publication Data

US 2015/0330365 A1    Nov. 19, 2015

(30) Foreign Application Priority Data

May 13, 2014   (IN) .......................... 2387/CHE/2014

(51) Int. Cl.
*G05D 3/12*       (2006.01)
*G05D 5/00*       (2006.01)
(Continued)

(52) U.S. Cl.
CPC ............... *F03D 7/048* (2013.01); *F03D 9/11* (2016.05); *F03D 9/257* (2017.02); *G05B 13/021* (2013.01); *Y02E 10/723* (2013.01)

(58) Field of Classification Search
CPC ......... F03D 7/048; F03D 9/11; G05B 13/021; Y02E 10/723
(Continued)

(56) References Cited

U.S. PATENT DOCUMENTS

| 6,925,385 B2 | 8/2005 | Ghosh et al. | |
| 2002/0194113 A1* | 12/2002 | Lof | G01W 1/10 |
| | | | 705/37 |

(Continued)

FOREIGN PATENT DOCUMENTS

| CN | 102368617 A | 3/2012 |
| WO | 2013013267 A1 | 1/2013 |

OTHER PUBLICATIONS

Khalid et al., "A Model Predictive Control Approach to the Problem of Wind Power Smoothing with Controlled Battery Storage", Renewable Energy, pp. 1520-1526, vol. 35, Issue 7, 2009.

(Continued)

*Primary Examiner* — Ziaul Karim
(74) *Attorney, Agent, or Firm* — Douglas D. Zhang; GE Global Patent Operation

(57) ABSTRACT

A method for optimizing a hybrid wind system including a wind farm having a plurality of wind turbines and one or more energy storage units, is presented. The method includes acquiring actual wind power data associated with one or more dispatch windows. The method includes determining forecasted wind farm power estimates corresponding to the dispatch windows using a plurality of forecast schemes. The method includes computing difference values by comparing the forecasted wind farm power estimates to the actual wind power data. The method includes identifying a wind power forecast scheme based at least in part on the computed difference values and balancing a penalty to the grid with life consumption of the energy storage units while regulating the wind turbines and the energy storage units based at least in part on a subsequent forecasted wind farm power estimate generated using the identified wind power forecast scheme.

14 Claims, 5 Drawing Sheets

(51) Int. Cl.
G05D 9/00 (2006.01)
G05D 11/00 (2006.01)
G05D 17/00 (2006.01)
F03D 7/04 (2006.01)
G05B 13/02 (2006.01)
F03D 9/25 (2016.01)
F03D 9/11 (2016.01)

(58) Field of Classification Search
USPC .................................................. 700/286–296
See application file for complete search history.

(56) References Cited

U.S. PATENT DOCUMENTS

| | | | |
|---|---|---|---|
| 2006/0276938 A1* | 12/2006 | Miller | G06Q 50/06 700/295 |
| 2007/0047163 A1 | 3/2007 | Lutze et al. | |
| 2008/0167822 A1* | 7/2008 | Loukos | G01W 1/10 702/3 |
| 2008/0179887 A1 | 7/2008 | Kawazoe et al. | |
| 2010/0332373 A1* | 12/2010 | Crabtree | G06Q 50/06 705/37 |
| 2011/0153099 A1 | 6/2011 | Garcia | |
| 2011/0288691 A1 | 11/2011 | Abe et al. | |
| 2012/0053750 A1 | 3/2012 | Viassolo et al. | |
| 2013/0024044 A1 | 1/2013 | Sharma et al. | |
| 2013/0178991 A1* | 7/2013 | Gheerardyn | G05B 13/02 700/286 |
| 2013/0268463 A1* | 10/2013 | Arya | G06Q 10/04 705/400 |
| 2013/0317959 A1* | 11/2013 | Joos | C25B 15/02 705/34 |
| 2014/0316592 A1* | 10/2014 | Haj-Maharsi | F03D 7/0284 700/287 |

OTHER PUBLICATIONS

India Office Action with Application No. 2387/CHE/2014 dated May 31, 2018.

* cited by examiner

METHOD AND SYSTEM FOR HYBRID WIND POWER GENERATION

BACKGROUND

Embodiments of the present disclosure generally relate to a method and system for hybrid wind power generation and more specifically to method and system for effective usage of batteries for optimizing hybrid wind power generation.

Wind farms include wind turbines spread over a large area of land that harness wind energy to generate power for utility purposes. Wind farms are coupled to a grid with each farm expected to provide a predefined or forecasted amount of power at a fixed power rating to the grid. However, due to the uncontrollable variations in the wind energy, such as wind speed, it is difficult to continuously provide the predefined amount of power at the fixed power ratings, and there is always some difference between the power supplied from the wind farm and the predefined amount of power.

One approach for compensation in a situation where wind turbines of a wind farm are unable to supply the required power is to use supplementary energy storage in the wind farm. Accordingly, a hybrid wind power generation system may be established to provide required power to the grid. Further, when using the hybrid wind power generation system, additional power generated by the wind turbine may be stored in the energy storage system.

Energy storage systems of hybrid wind power generation systems typically include one or more batteries for supplying and storing energy based on power generated by the wind turbine. When using a battery, it is desirable to optimize battery usage for longer battery life. When a simple feedback based control algorithm is employed for smoothing power generated by the wind turbine, a battery may be operated at a saturated level causing undesirable and large cycling. Battery cycling affects the life of the battery and increases the frequency of battery replacement scheduling.

Therefore, it would be desirable to more optimally use the battery such that overall operation cost of the hybrid wind system is reduced.

BRIEF DESCRIPTION

In accordance with aspects of the present disclosure, a method for optimizing a hybrid wind system including a wind farm having a plurality of wind turbines and one or more energy storage units, is presented. The method includes acquiring actual wind power data associated with one or more dispatch windows. Further, the method includes determining forecasted wind farm power estimates corresponding to the one or more dispatch windows using a plurality of forecast schemes. Also, the method includes computing difference values by comparing the forecasted wind farm power estimates to the actual wind power data. Further, the method includes identifying a wind power forecast scheme based at least in part on the computed difference values. Also, the method includes balancing a penalty to the grid with life consumption of the one or more energy storage units while regulating the wind turbines and the one or more energy storage units based at least in part on a subsequent forecasted wind farm power estimate generated using the identified wind power forecast scheme.

In accordance with another aspect of the present disclosure, a hybrid wind system, including a wind farm coupled to a grid and comprising a plurality of wind turbines, a plurality of batteries located proximate to respective ones of the plurality of wind turbines, and a plurality of transducers located proximate to the plurality of wind turbines, is presented. The system includes a centralized controller programmed. The centralized controller executes a step of acquiring actual wind power data associated with one or more dispatch windows. The centralized controller also executes a step of determining forecasted wind farm power estimates corresponding to the one or more dispatch windows using a plurality of forecast schemes. Furthermore, the centralized controller executes a step of computing difference values by comparing the forecasted wind farm power estimates to the actual wind power data. In addition, the centralized controller executes a step of identifying a wind power forecast scheme based at least in part on the computed difference values. Also, the centralized controller executes a step of determining a battery set point for one or more time slots of the one or more dispatch windows based at least in part on the subsequent forecasted wind farm power estimate generated using the identified wind power forecast scheme and balancing a penalty to the grid with life consumption of the batteries while regulating the wind turbines and the batteries based at least in part on a subsequent forecasted wind farm power estimate generated using the identified wind power forecast scheme.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of a method for optimizing a hybrid wind system are presented. The hybrid wind system includes a wind farm having a plurality of wind turbines operatively coupled to one or more energy storage units. Operation of the hybrid wind system is controlled such that life of the one or more energy storage units is enhanced.

Figure 1:
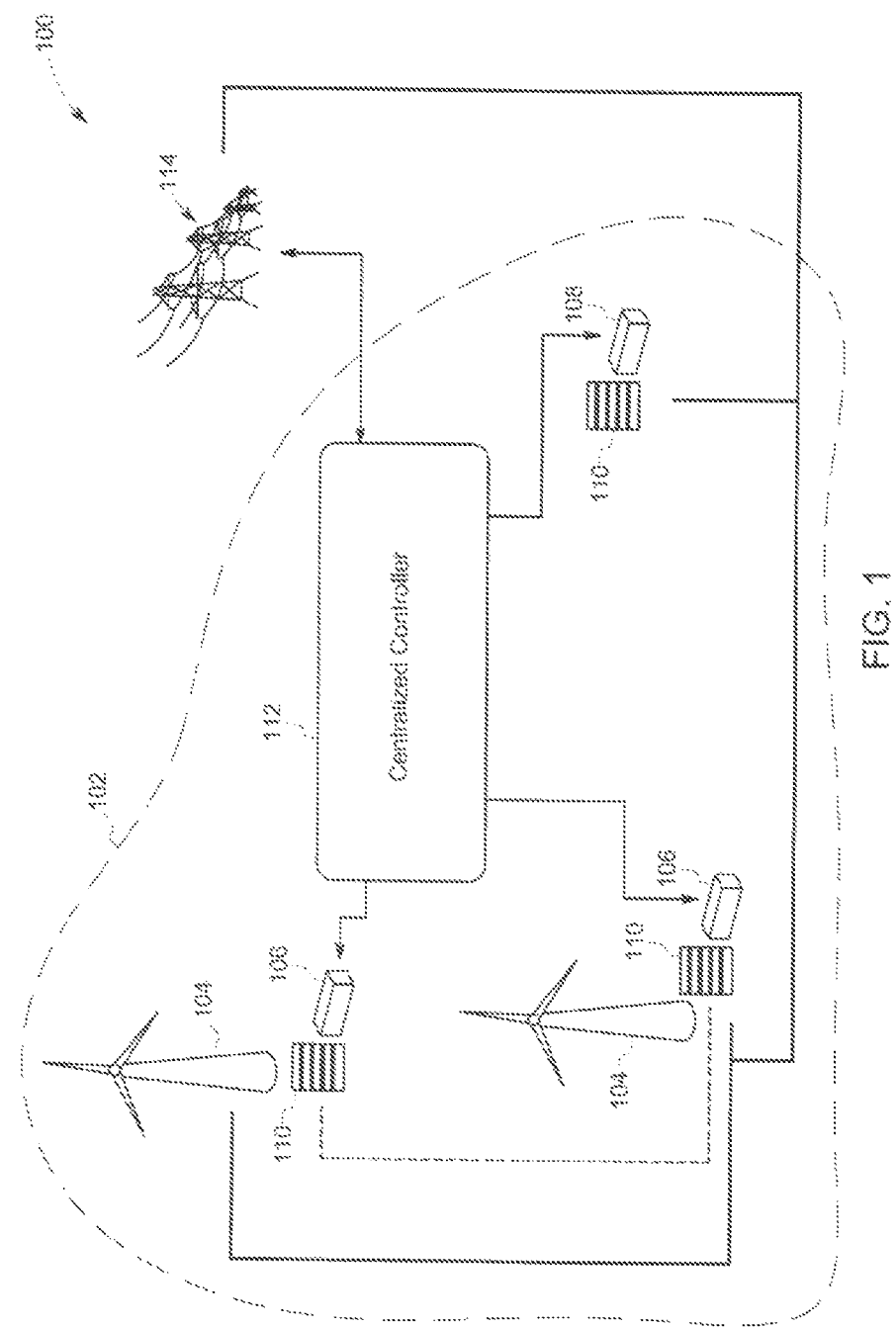
FIG. 1 is a diagrammatical representation of a system for optimizing power from a hybrid wind battery system.

Turning now to the drawings, and by way of example in FIG. 1, a diagrammatical representation 100 of a hybrid wind system, according to aspects of the present disclosure is depicted. The hybrid wind system 100 includes a wind farm 102. In one example, the wind farm 102 may include a plurality of wind turbines 104 operatively coupled to one or more energy storage units 106. In one example, the one or more energy storage units 106 may include one or more batteries.

In one embodiment, each wind turbine 104 may be operatively coupled to a corresponding energy storage unit 106. In addition or as an alternative, the wind farm 102 may include a centralized energy storage unit 108. Further, the wind turbines 104 and energy storage units 106, 108 are coupled to a grid 114. The hybrid wind system 100 may also include sub-controllers 110 and a centralized controller 112. In some embodiments, a respective sub-controller 110 may be placed in close proximity to each wind turbine 104 and/or energy storage unit 106 and is referred to as a "turbine-level controller."

In one embodiment, the sub-controllers 110 are operatively coupled to the centralized controller 112, and the centralized controller 112 is operatively coupled to the grid 114. In a more specific aspect of this embodiment, the centralized controller 112 may be configured to control communication between the grid 114 and the sub-controllers controllers 110. The sub-controllers 110 and the centralized controller 112 may be configured to perform data processing as well as computations for generating control signals for use by the wind turbines 104 and energy storage units 106. The sub-controllers 110 and the centralized controller 112 may be collectively referred to as a controller 109 (shown in FIG. 2), meaning that various steps described herein may be performed by either the sub-controllers 110 or the centralized controller 112 unless clearly stated otherwise.

Figure 2:
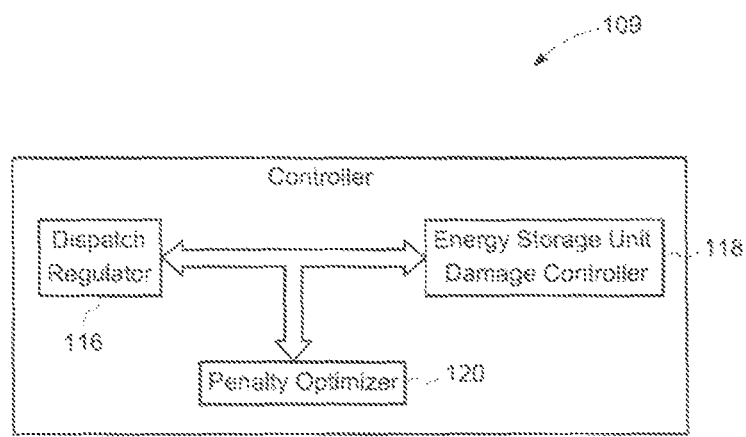
FIG. 2 is a block diagram of a controller for the hybrid wind battery system of FIG. 1.

As shown in FIG. 2, controller 109 comprises a dispatch regulator 116, an energy storage unit damage controller 118, and a penalty optimizer 120. The dispatch regulator 116 is configured to determine a dispatchability quantity $D_p$ of a plurality of wind turbines of the wind farm. The term "dispatchability quantity" as used herein, may be used to refer to a deviation from the forecasted wind farm power estimate. In a more specific embodiment, the dispatchabity quantity is the ratio of root mean square value of difference between the forecasted wind farm power estimate and the plant power to the plant power. The term plant power, as used herein, may be used to refer to a sum of an actual wind power data and power provided by the energy storage unit(s). In a more specific embodiment, the dispatch regulator 116 may be configured to reduce the value of dispatchability quantity $D_p$ of the wind farm by determination and communication of one or more set points for the energy storage units 106. The operation of the dispatch regulator 116 will be explained in greater detail with respect to FIG. 4.

The energy storage unit damage controller 118 is configured to determine a damage equivalent quantity (DEQ) corresponding to the energy storage units 106. As used herein "damage equivalent quantity" means a depth of discharge value for a predefined number of cycles of the energy storage unit which will be equivalent to life consumption of the energy storage unit corresponding to actual depth of discharge values over a period of time. Particularly, the energy storage unit damage controller may be configured to reduce value of the damage equivalent quantity (DEQ) corresponding to the energy storage units 106. The energy storage unit damage controller may also be configured to determine a consumption equivalent (C) corresponding to the energy storage unit based on the determined damage equivalent quantity (DEQ). As used herein "consumption equivalent" means a percentage of life consumed for the energy storage unit. Alternatively, the consumption equivalent may provide a measure of the remaining life of the energy storage unit. The operation of the energy storage unit damage controller will be explained in greater detail with respect to FIGS. 5 and 6. The penalty optimizer 120 is configured to balance a penalty to the grid 114 with life consumption of the one or more energy storage units while regulating the consumption equivalent (C) of the energy storage units and the dispatchability quantity ($D_p$) of the wind farm. Penalty optimization is described in greater detail below with respect to element 218 of FIG. 3.

Figure 3:
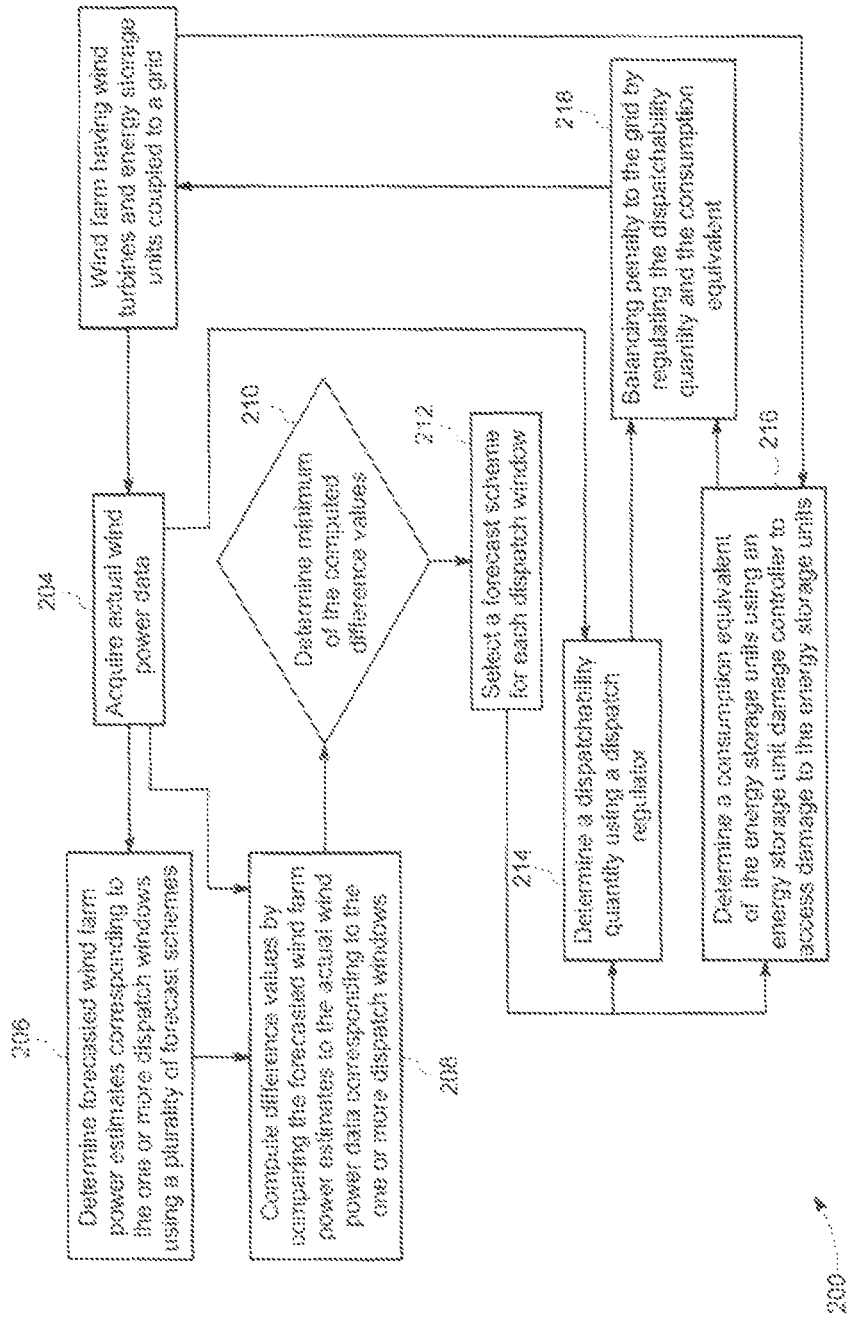
FIG. 3 is a flow chart representing an exemplary method of optimizing power in the hybrid wind battery system of FIG. 1, according to aspects of the present disclosure.

Referring to FIG. 3, a diagrammatical representation 200 of a method of optimization of a hybrid wind system according to aspects of the present disclosure is depicted. For the ease of understanding, the steps of FIG. 3 will be described with respect to the elements of FIGS. 1-2. At step 204, actual wind power data is acquired for one or more dispatch windows. A dispatch window may include a plurality of time slots, and a combination of dispatch windows is referred to as a dataset. In one non-limiting example, the dispatch window may span for 15 minutes, and a time slot may span for 1 second. The term "actual wind power data," as used herein, refers to electrical power output from the wind turbines 104 which may be measured using current, voltage, and/or power transducers. In one embodiment one or more of the transducers is located at or near each wind turbine 104, for example. The actual wind power data over a dispatch window is a time series of data for the different time slots within that dispatch window. In one non-limiting example, the actual wind power data for a dispatch window may include a mean of actual wind power data acquired at different time slots in that dispatch window. The actual wind power data for one or more dispatch windows may be acquired and further processed by the controller 109. Further, the actual wind power data for the one or more dispatch windows may be most efficiently processed by the centralized controller 112, in one embodiment.

At step 206, forecasted wind farm power estimates corresponding to the one or more dispatch windows are determined by employing a plurality of forecast schemes. In one example, for each dispatch window, a plurality of forecasted wind farm power estimates may be determined by employing the plurality of forecast schemes. The plurality of forecast schemes may comprise at least several of a persistence forecast scheme, a weighted regression forecast scheme, a linear fitting forecast scheme, a neural network based scheme, a support vector regression scheme, and the like. In one example, the forecasted wind farm power estimate may be determined by employing the actual wind power data for one or more past dispatch windows. The forecasted wind farm power estimates may be determined by using the controller, in one example. The term 'forecasted wind farm power estimate' as used herein, may be used to refer to a power forecasted for the one or more dispatch windows and to be delivered from the wind farm to the grid for the corresponding one or more dispatch windows. Furthermore, in one example, the forecasted wind farm power estimates corresponding to the one or more dispatch windows are determined by employing a centralized controller.

Difference values are then computed at step 208 for the one or more dispatch windows by comparing the actual wind power data with the forecasted wind farm power estimates. Accordingly, a plurality of difference values may be obtained for each dispatch window. Next, at step 210, the difference values corresponding to the one or more dispatch windows are compared to each other in order to identify a minimum of the plurality of difference values.

At step 212, a forecast scheme is selected for each dispatch window such that the difference value using that forecast scheme is the minimum of the plurality of difference values for previous dispatch window(s). In another example, the minimum difference value for each of the one or more past dispatch windows may be studied to identify if there is a specific forecast scheme which has been consistently resulting in a minimum difference value across the past dispatch windows and accordingly, that forecast scheme may be selected. The selected forecast scheme is then used (until it is superseded by a different forecast scheme identified in the iterative loop of method 200) and is communicated to a grid operator as forecast from wind farm, such as wind farm 102 of FIG. 1. Furthermore, the selected forecast scheme may be employed for determining the dispatchability quantity and the consumption equivalent in steps 214 and 216.

In one embodiment, a first dispatch window spans from time $t_1$ to time $t_2$, and a second dispatch window spans from time $t_2$ to time $t_3$. Once a forecast scheme which yields a minimum difference value in the first dispatch window is identified at step 212, that forecast scheme may be employed as the forecast scheme which is used during the second dispatch window when determining the dispatchability quantity and the consumption equivalent in steps 214 and 216 and optionally for providing a forecasted wind farm power estimate to the grid 114. Power may be provided to the grid 114 by time $t_3$ using a combination of actual wind power and supplemental power $P_{BESS}$ provided by the energy storage units 106 and/or 108.

In an optional embodiment of step 212, by using the forecasted wind farm power estimate and the actual wind power data for the second dispatch window, a difference value for the second dispatch window may be determined. In one example, a difference value ($F_{err}$) corresponding to a dispatch window may be represented by using equation (1).

$$F_{err} = \frac{\sqrt{\frac{1}{N}\sum_{n=1}^{N}(F_n - W_n)^2}}{\frac{1}{N}\sum_{n=1}^{N}W_n} \quad (1)$$

where $F_n$ is a forecasted wind farm power estimate at time slot 'n' corresponding to the dispatch window, $W_n$ is an actual wind power data at time slot 'n' corresponding to the dispatch window, and N is the number of time slots corresponding to the dispatch window.

If the value of $F_{err}$ is low, it is indicative of a relatively accurate selection of the forecast scheme for the dispatch window. In a similar manner, $F_{err}$ for the other dispatch windows may also be identified. From step 212, the control may simultaneously or sequentially pass to steps 214 and 216.

At step 214, a dispatchability quantity "$D_p$" for the wind farm may be determined using dispatch regulator 116. Moreover, in one example, the dispatch regulator 116 may operate in one dispatch window and therefore, have a smaller time resolution of operation. The dispatch regulator 116 determines the dispatchability quantity $D_p$ based at least in part on a forecasted wind farm power estimate for a dispatch window, which is determined based on the forecast scheme identified at the step 212. The determination of the dispatchability quantity for the dispatch window will be explained in greater detail with respect to FIG. 4.

At step 216, one or more consumption equivalents "C" of the one or more energy storage units 106, 108 may be determined by using the energy storage unit damage controller 118 to assess remaining useful life. The consumption equivalent C may be determined based on a damage equivalent quantity (DEQ) determined by the energy storage unit damage controller 118. Moreover, the damage equivalent quantity (DEQ) may be determined based at least in part on the forecasted wind farm power estimate for a dispatch window determined based on the forecast scheme identified at the step 212. The life of each respective one of energy storage units 106, 108 may be continuously monitored by studying respective DEQ/C. In one example, the determination of the dispatchability quantity ($D_p$) by the dispatch regulator 116 and the determination of the consumption equivalent (C) by the energy storage unit damage controller 118 may be simultaneously executed for the one or more dispatch windows. Also, similar to the dispatch regulator 116, the energy storage unit damage controller 118 may operate in one dispatch window and therefore may have a smaller time resolution of operation. The determination of the consumption equivalent by the energy storage unit damage controller 118 will be explained in greater detail with respect to FIG. 5.

At step 218, the penalty to be paid to the grid 114 may be balanced with life consumption for the one or more energy storage units while regulating the consumption equivalent (C) of the energy storage units 106 and the dispatchability quantity ($D_p$) of the wind farm 102. The term "penalty" means an amount to be paid to a grid operator for not providing predefined power to the grid. When the wind turbines 104 are alone providing the power to the grid, the penalty may be determined from a product of cost per unit of energy and difference between predefined energy to be provided to the grid and actual wind energy provided by the wind turbines 104. In one example, the predefined energy to be provided to the grid is the energy communicated to the grid operator as forecast from wind farm. However, if the wind turbines 104 along with energy storage units 106 and/or 108 provide power to the grid, the penalty may be determined from a product of cost per unit of energy and difference between predefined energy to be provided to the grid and plant energy. Here, plant energy is a sum of actual wind energy and the energy provided by the energy storage units. According to aspects of present disclosure, if the wind turbines 104 along with energy storage units provide power to the grid, the dispatchability quantity ($D_p$) may be used to determine the penalty to be paid to the grid.

The term "balancing a penalty to the grid," as used herein, refers to reducing the penalty while regulating considerations of the damage equivalent quantity and/or consumption equivalent (C) of the energy storage units and the dispatchability quantity ($D_p$) of the wind farm. Any of a number of various types of balancing techniques may be used. In one example, the balancing is such that the penalty is reduced for one or more dispatch windows to an acceptable level without reducing life of the energy storage units 106 and/or 108 any more than is required. In certain scenarios, a tradeoff between the penalty to be paid to the grid 114 and the life of the energy storage units 106 is needed. The tradeoff aids to reduce the penalty and/or overall operational cost of the hybrid wind system over a period of time (such as 3-4 years, for example). In one example, balancing the penalty to the grid includes acquiring a balance between the cost of the one or more energy storage units and the corresponding penalty to the grid. In one example, balancing the penalty to the grid includes acquiring a balance between the cost of replacing one or more energy storage units and the corresponding penalty to the grid over a life time of the energy storage units.

The balancing of the penalty to the grid may be a function of the cost of the one or more energy storage units, the DEQ or C value, and the corresponding penalty to the grid. In one embodiment, the balancing of the penalty to the grid may be such that the sum of the cost of replacing the one or more energy storage units and the corresponding penalty to the grid over the life time of the energy storage units is a minimum value. In another embodiment, when the requirements of the grid are stringent, it may be required that the power to the grid has to be provided as promised without considering the life of the energy storage units. In this scenario, the balancing of the penalty to the grid may be done such that the penalty to the grid is maintained minimum, but the cost of the one or more energy storage units is compromised on.

In yet another embodiment, when the grid requirements are not stringent but the cost of the energy storage unit(s) is critical, a penalty may be provided to the grid without charging/discharging the energy storage units 106/108 repeatedly to provide for the deviation from the forecasted wind farm power estimate. In this scenario, the balancing of the penalty to the grid may be done such that the penalty is paid to the grid by maintaining the cost of replacing the one or more energy storage units at a minimum value. Additionally, control may pass from step 218 to step 204, and the steps 204-218 are then repeated in a recurring manner. Furthermore, in one example, the steps 208-218 may be executed by the centralized controller 112.

Figure 4:
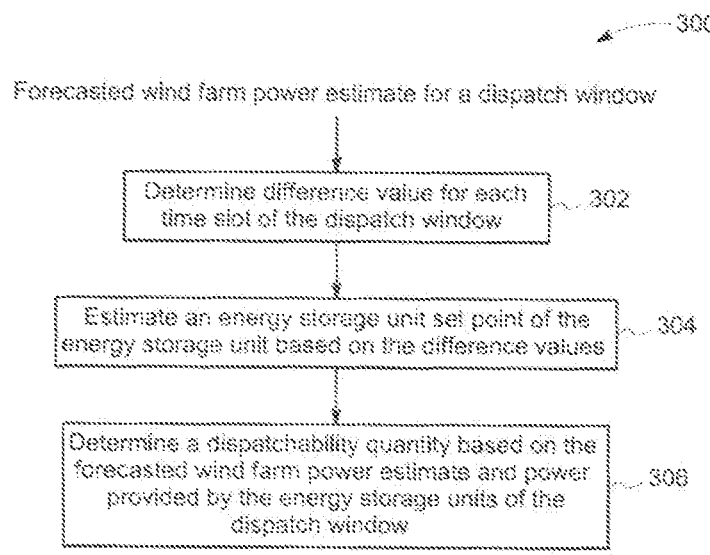
FIG. 4 is a detailed flow chart representing a step of FIG. 3, according to aspects of the present disclosure.

Referring to FIG. 4, a flow chart 300 representing a step of FIG. 3, according to aspects of the present disclosure, is presented. Particularly, FIG. 4 represents an exemplary method of operation of a dispatch regulator 116 operated in accordance with step 214 of FIG. 3. As noted hereinabove, the forecasted wind farm power estimate for a dispatch window may be determined based on a forecast scheme yielding lowest difference value for a prior dispatch window. The forecasted wind farm power estimate for the dispatch window may be provided as input to step 302. Once the forecasted wind farm power estimate for the dispatch window is provided, a difference value for each time slot corresponding to the dispatch window may be determined at step 302. As noted hereinabove, each dispatch window may include a plurality of time slots. This difference value for a time slot may be a difference between the forecasted wind farm power estimate and the actual wind power data for that time slot of the dispatch window, in one non-limiting example. However, in another example, the difference value for a time slot may be determined by employing equation (1).

At step 304, based on the difference value for each time slot, a set point for the energy storage units 106/108 may be determined by the dispatch regulator 116. As used herein, "set point" refers to a reference provided to the energy storage units 106 and/or 108 based on which the energy storage units 106 and/or 108 may charge or discharge by a certain value of charge. Alternatively, based on the set point, the power to be provided by the energy storage units may be determined. The set point may be computed by the dispatch regulator 116 by considering constraints such as charge level, power level, and any other relevant characteristic of the energy storage unit. In one non-limiting example, if the actual wind power data in a time slot of a dispatch window is greater than the forecasted wind farm power estimate for that time slot the difference value for that time slot may be provided as a set point to the energy storage unit 106/108. Accordingly, the energy storage unit 106/108 may store the excess power generated by the plurality of wind turbines 104. That is, the energy storage units 106/108 may be charged. Also, when the actual wind power data in a time slot of the dispatch window is less than the forecasted wind farm power estimate for that time slot, the difference value may be provided as a set point for the energy storage units 106. Accordingly, one or more energy storage units may be discharged based on the set point, and a power $P_{BESS}$ may be supplied by the energy storage unit 106/108 to the grid 114 based on the set point. In accordance with step 304, the actual wind power data for the current dispatch window may be employed while determining the set point(s) in the current dispatch window.

The dispatch regulator 116 may comprise, for example, a proportional controller, a proportional integral controller with a certain value of integrator gain, or an estimator battery energy storage system (E-BESS) controller. These controllers may employ the difference values corresponding to different time slots of the dispatch windows as input and provide a set point as the output. In one example, the output includes the power $P_{BESS}$ to be provided by the energy storage units. In one embodiment, the determination of the set point and the power to be provided by the energy storage unit $P_{BESS}$ is be determined by employing a centralized controller, but the manner in which the set points are provided to the energy storage units is determined by the sub-controllers. In this embodiment, it is useful for the state of charge of the energy storage units to be measured by the sub-controllers. When the dispatch regulator 116 comprises a proportional controller, the difference value for each of the time slot of the dispatch window may be provided as the set point by the dispatch regulator 116 to the energy storage units 106 and/or 108. Therefore, the power may be provided by the energy storage units 106 and/or 108 for each of the time slot of the dispatch window. Accordingly, at any instant of time the power to be provided by the energy storage units 106 and/or 108 may be equivalent to the difference value of the prior instant of time. The proportional controller is represented as:

$$P_{BESS}(i)=e(i-1) \qquad (2)$$

where $P_{BESS}(1)$ represents power provided by the energy storage units 106 and/or 108 at a time slot i and e(i−1) represents difference value corresponding to a time slot i−1.

In the example employing the proportional controller, the set point may be provided to the energy storage units 106 and/or 108 without considering the power rating and/or charge level of the energy storage units. In one example, if the energy storage units 106/108 are provided a set point to accordingly provide power from the energy storage units 106/108 and the power rating and/or charge level of the energy storage units is such that the demanded power cannot be provided by the energy storage units, it may lead to accumulation of difference values. In certain scenarios, the difference value over different time slots may be accumulated without being adequately provided by the energy storage units 106/108. Thus, a penalty to be paid to the grid increases considerably.

In another example, when the dispatch regulator 116 comprises a proportional integral controller with a certain integrator gain, an integrated difference value over all past time slots may be provided as the set point to the energy storage units 106 along with difference value for the prior time slot. The proportional integral controller may be represented as:

$$P_{BESS}(i) = K_p e(i-1) + K_i \textstyle\sum_{j=0}^{i-1} e(j) \qquad (3)$$

where $P_{BESS}(i)$ represents power provided by the energy storage units 106 and/or 108 at a time slot i, $e(i-1)$ represents difference value corresponding to a time slot time slot prior to i, that is, at i−1, $\sum_{j=0}^{i-1} e(j)$ represents an integrated difference value over all past time slots, $K_p$ and $K_i$ are the gains corresponding to the proportional and integral controller. The PI controller is configured to provide a smooth cycling of the energy storage units thereby improving life of the energy storage units.

In yet another example, the dispatch regulator 116 may be configured to operate as an estimator battery energy storage system (E-BESS) controller. In one example, the E-BESS controller may comprise a PI controller. The E-BESS controller may be configured to determine power to be provided by the energy storage units $P_{BESS}(i)$. The plant power $P_{plant}$ at any time slot i may be represented by equation (4)

$$P_{Plant}(i) = P_{BESS}(i) + P_{Wind}(i) \qquad (4)$$

where, $P_{BESS}(i)$ is the power provided by the energy storage units and $P_{wind}(i)$ is the actual wind power data provided by the wind turbines 104 at time slot i.

Further, the power to be provided by the energy storage units $P_{BESS}(i)$ may be determined based on difference between the forecasted wind farm power for a time slot i ($P_{Forecast}(i)$) and the actual wind power data for the time slot (i−1) ($P_{Wind}(i-1)$) as represented in equation (5).

$$P_{BESS}(i) = P_{Forecast}(i) - P_{Wind}(i-1) \qquad (5)$$

When determining the power to be provided by the energy storage units $P_{BESS}(i)$ at the time slot i, since, the actual wind power data at the time slot i is not available till the end of time slot i, therefore, the actual wind power data at the time slot i−1 may be employed. However, the value of $P_{BESS}(i)$ will be more accurate if the actual wind power data at the time slot i is employed for determining the power to be provided by the energy storage units. Hence, in order to factor for the actual wind power data at the time slot i an estimator ê(i) may be employed in the equation (5) to obtain a more accurate value of $P_{BESS}(i)$. Accordingly, the modified equation of power provided by the energy storage units $P_{BESS}(i)$ is represented by equation (6).

$$P_{BESS}(i) = P_{Forecast}(i) - P_{Wind}(i-1) - ê(i) \qquad (6)$$

if ê(i) is assumed to be $(P_{Wind}(i) - P_{Wind}(i-1))$, then $$P_{BESS}(i) = P_{Forecast}(i) - P_{Wind}(i) \qquad (7)$$

$$P_{Forecast}(i) = P_{BESS}(i) + P_{Wind}(i) \qquad (8)$$

considering equation (4) and (8) $P_{Plant}(i) = P_{Forecast}(i)$, which is an ideal situation to avoid penalty to be paid to the grid. However, practically, $P_{Wind}(i)$ may not be available before the end of time slot i. Hence, ê(i) may be approximated as $$ê(i) = P_{Wind}(i-1) - P_{Wind}(i-2) \qquad (9)$$

Therefore, by employing the E-BESS controller, the power provided by the energy storage units $P_{BESS}(i)$ is represented by equation (10).

$$P_{BESS}(i) = P_{Forecast}(i) - 2P_{Wind}(i-1) + P_{Wind}(i-2) \qquad (10)$$

where, $P_{Forecast}(i)$ is forecasted wind farm power estimate in the dispatch window, $P_{Wind}(i)$ actual wind power data in the dispatch window, ê(i) is a dispatch estimator, $P_{BESS}(i)$ is set point in the dispatch window, and $P_{Wind}(i-1)$ and $P_{Wind}(i-2)$ are actual wind power data over prior dispatch windows.

As noted hereinabove, for different types of dispatch regulators the set point is determined differently. Based on the set point, the power to be provided by the energy storage unit 106 ($P_{BESS}$) may vary. The use of other controller/control techniques for determination of the set point/power to be provided by the energy storage unit 106 ($P_{BESS}$) is anticipated. Further, the set point to the energy storage unit 106 and the estimated power provided by the energy storage units may be relatively accurate using the E-BESS controller.

Next, at step 306, a dispatchability quantity $D_p$ of the wind farm may be determined. The dispatchability quantity $D_p$ of the wind farm may be determined for one or more dispatch windows of the dataset. The dispatchablity quantity $D_p$ may be determined using at least in part the power $P_{BESS}$ provided by the energy storage units 106 and the forecasted wind farm power estimate for the dispatch window. As discussed above, the power $P_{BESS}$ may be determined based on the set point. By way of example, the dispatchability quantity ($D_p$) corresponding to a dispatch window may be represented by equation (11):

$$D_p = \frac{\sqrt{\frac{1}{N}\sum_{n=1}^{N}(F_n - P_n)^2}}{\frac{1}{N}\sum_{n=1}^{N}P_n} \qquad (11)$$

where $F_n$ is a forecasted wind farm power estimate at time slot 'n' corresponding to a dispatch window, $P_n$ is a plant power at slot 'n' which is a combination of an actual wind power data $W_n$ and the power $P_{BESS}$ provided by the energy storage unit, and N is the number of time slots corresponding to a dispatch window.

The dispatchability quantity $D_p$ may vary with variation in the power $P_{BESS}$ provided by the energy storage units 106. As noted hereinabove, the power $P_{BESS}$ provided by the energy storage units 106 may depend on the set point(s). Also, the manner in which the set point(s) is/are determined and the value of set point(s) may vary with the type of dispatch regulator. Therefore, the dispatchability quantity $D_p$ varies with the type of dispatch regulator. For example, the value of dispatchability quantity $D_p$ of the wind farm corresponding to a dispatch window may be a lower value by employing the E-BESS controller when compared to the dispatchability quantity $D_p$ obtained by the proportional controller and the proportional integral controller with integrator gain 0.1.

Furthermore, it may be noted that in certain situations the dispatchability quantity $D_p$ may be zero. This is achieved when the energy storage unit(s) 106, 108 may completely provide the difference between the forecasted wind farm power estimate and the actual wind power data corresponding to the one or more dispatch windows. However, fully compensating for the differences may lead to large cycling of the energy storage unit(s) thereby reducing the life of the energy storage unit(s) and in turn increasing an overall operational cost of the hybrid wind system 100. Therefore, it may not always make economic sense to provide a zero dispatchability quantity, and, according to aspects of the present disclosure such as those discussed above with respect to FIG. 3, the dispatchabilty quantity may be regulated such that the penalty is reduced somewhat but not fully so that the life of the energy storage unit(s) is not reduced considerably.

Figure 5:
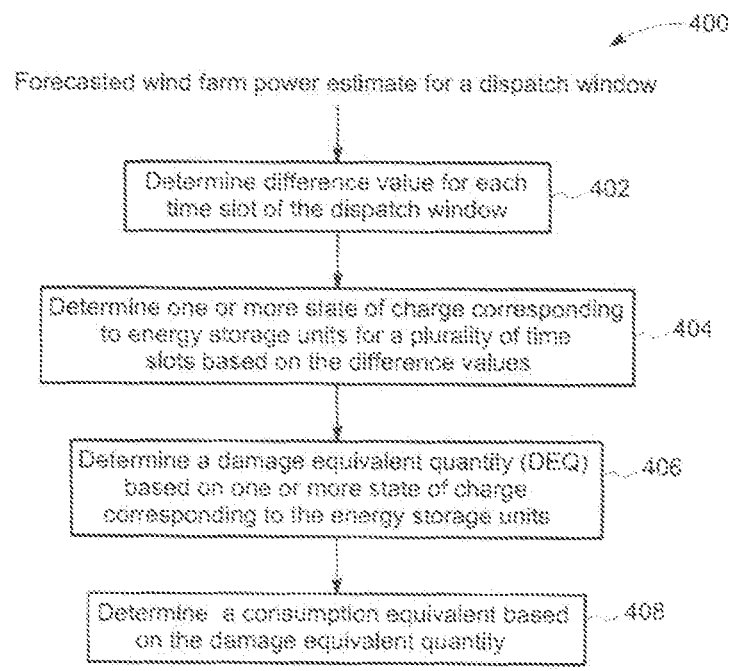
FIG. 5 is a detailed flow chart representing yet another step of FIG. 3, according to aspects of the present disclosure.

Turning now to FIG. 5, a flow chart 400 representing another step of FIG. 3, according to aspects of the present disclosure, is presented. Particularly, FIG. 5 represents an exemplary method of operation of an energy storage unit damage controller 118 in accordance with step 216 of FIG. 3. As noted hereinabove, the forecasted wind farm power estimate for a dispatch window may be determined based on a forecast scheme yielding lowest difference value for a prior dispatch window. The forecasted wind farm power estimate for the dispatch window may be provided as input to step 402. Once the forecasted wind farm power estimate for the dispatch window is provided, a difference value for each time slot corresponding to the dispatch window is determined at step 402. The difference value for the time slot may be a difference between the forecasted wind farm power estimate and the actual wind power data for that time slot of the dispatch window, in one example. However, in another example, the difference value for a time slot may be determined by employing equation (1). The step 402 may be same as step 302 of FIG. 4.

Moreover, a state of charge for the energy storage units 106, 108 may be determined at step 404 for each time slot of the dispatch window based on the difference value determined at step 402. The term 'state of charge' for the energy storage units, as used herein, may be used to refer to the charge level of the energy storage units 106, 108, such as, 0% state of charge is indicative of a completely discharged energy storage unit and 100% state of charge is indicative of a fully charged energy storage unit. As noted hereinabove, the energy storage units 106 and/or 108 may be provided a set point at step 304 based on the difference value determined at step 302/402. Based on the set point provided to the energy storage units 106 and/or 108, power $P_{BESS}$ may be provided by the energy storage units. Accordingly, the energy storage units 106/108 may be charged or discharged by a certain value. Therefore, state of charge of the energy storage units may be different for different time slots of the dispatch window. Hence, a time series of the state of charge may be obtained. This time series of the state of charge may be clustered into different values of depth of discharge using techniques such as rainflow-counting. Alternatively, the clustering into different values of depth of discharge may include identifying the number of cycles for each value of depth of discharge. It may be noted that the depth of discharge is amplitude of a state of charge cycle. Since the state of charge varies for different time slots, cycling of the energy storage units 106 occurs.

At step 406, the depth of discharge along with corresponding number of cycles may be employed to determine a damage equivalent quantity (DEQ) for a predefined number of cycles by using the energy storage unit damage controller 118. The calculation of the damage equivalent quantity may be similar to Miner's rule used in material fatigue damage calculation, in one non-limiting example. The damage equivalent quantity (DEQ) provides a metric for the damage and/or life consumption of the energy storage units 106 due to cycling of energy storage units 106. In one example, the DEQ may correspond to a depth of discharge corresponding to damage of the energy storage units. By way of example, the number of cycles corresponding to the depth of discharge may be determined by using an S-N curve 500 (shown in FIG. 6) corresponding to the energy storage units 106. As will be appreciated, the S-N curve may be used to refer to a depth of discharge versus number of cycles curve corresponding to an energy storage unit.

In addition, the depth of discharge, the number of cycles corresponding to the depth of discharge along with an exponent (m) of the S-N curve 500, and an arbitrary number of cycles $N_{DEQ}$, such as $10^4$ may be employed to determine a damage equivalent quantity (DEQ) for energy storage units 106. In one example, the damage equivalent quantity (DEQ) may be determined by the below mentioned equation (12):

$$DEQ = \left(\frac{1}{N_{DEQ}} \sum_{i=1}^{n} n_i S_i^m\right)^{\frac{1}{m}} \qquad (12)$$

where, $S_i$ is a depth of discharge, $n_i$ is a number of cycles corresponding to the depth of discharge, n is the number of time slots in a dispatch window and m is an exponent of the S-N curve. In one example, 'm' is the slope of the S-N curve plotted with logarithmic scales.

Similarly, different values of DEQ may be determined for different dispatch windows. Moreover, different values of DEQ may be obtained by using different forecast schemes for different dispatch windows.

Figure 6:
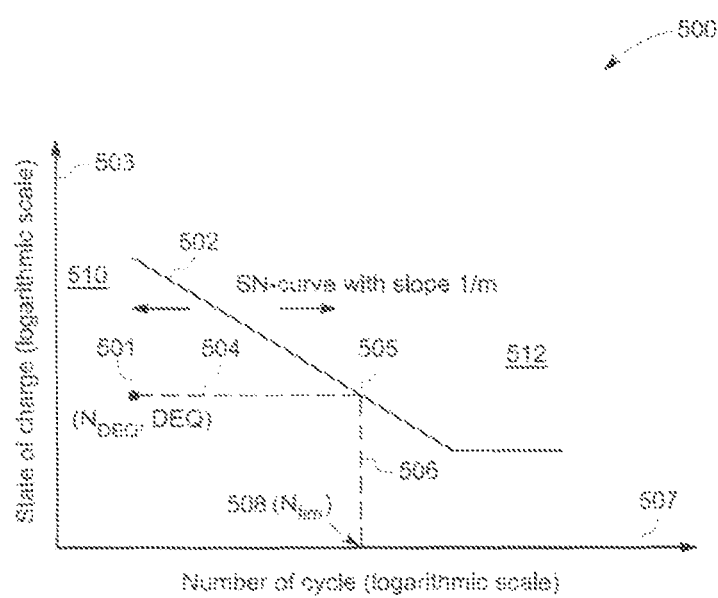
FIG. 6 is a diagrammatical representation of an S-N-curve corresponding to energy storage units used in the system of FIG. 1.

Finally, at step 408, a consumption equivalent C may be determined based on the damage equivalent quantity (DEQ) determined at step 406. The consumption equivalent C may be determined employing the S-N curve 500 of FIG. 6. FIG. 6 is a diagrammatical representation of an S-N-curve corresponding to energy storage units 106/108 used in the system of FIG. 1. As noted hereinabove, S-N curve may be used to refer to a depth of discharge versus number of cycles curve corresponding to an energy storage unit. If ($N_1$, $D_1$) is a point on the curve 502 of the S-N curve 500, then for a value of depth of discharge of $D_1$, the energy storage unit is likely to fail after $N_1$ number of cycles of charging/discharging of the energy storage unit. Based on the determined DEQ value and the corresponding $N_{DEQ}$ value, a point ($N_{DEQ}$, DEQ) 501 may be identified in a plot of the S-N curve 500 depicted in FIG. 6. It may be noted that if the point 501 ($N_{DEQ}$, DEQ) lies on the left hand side 510 of the curve 502 it is indicative that the energy storage unit 106/108 has remaining useful life. However, if the point (DEQ, $N_{DEQ}$) lies in the right hand side 512 of the curve 502 it is indicative of the fact that the energy storage unit 106/108 has failed. Therefore, if the point ($N_{DEQ}$, DEQ) lies in the left hand side 510 of the curve 502 a horizontal line 504 may be drawn to the curve 502. Further, from the point of intersection 505 of the horizontal line 504 and the curve 502, a vertical line 506 is dropped to an x-axis 507. At the intersection of the vertical line 506 and the x-axis 507, a point 508 may be obtained. Reference numeral 508 may be representative of number of cycles $N_{lim}$. The number of cycles $N_{lim}$ may be representative of the number of cycles required for an energy storage unit 106 to fail at a depth of discharge of DEQ. Furthermore, a consumption equivalent (C) of the energy storage unit may be determined based on the following equation (13):

$$\text{Consumption equivalent } (C) = \left(\frac{N_{DEQ}}{N_{lim}}\right) \quad (13)$$

where, $N_{lim}=k*(DEQ)^{-m}$ where, $N_{lim}$=number of cycles to failure of energy storage unit(s) with a depth of discharge of DEQ, $k=N*(DoD)^m$ and where, N is number of cycles and DoD is percentage depth of discharge corresponding to the number of cycles N.

When employing multiple energy storage units 106 at respective wind turbines in a wind farm, in one embodiment, a battery control technique may be employed so that a state of charge of each of the energy storage units 106 is controlled such that the state of charge for each of the energy storage units 106 is substantially similar. As a result, energy storage units may be operated as one aggregate farm energy storage unit. The term 'one aggregate farm energy storage unit' as used herein may be used to refer to a single energy storage unit equivalent to a combination of the one or more energy storage units employed in the wind farm. The life consumption of each of the one or more energy storage units may be substantially similar. Hence, the DEQ and the C values for each of the energy storage units may be substantially similar. As a result, the DEQ and the C values of the combination of energy storage units may be substantially similar to the DEQ and the C values for each of the energy storage units.

If the value of the consumption equivalent (C) of the energy storage unit is maintained at a low value, the remaining life of the energy storage unit may be enhanced. As will be appreciated, if C is equal to 1 it is indicative of the failure of the energy storage unit. However, if C is less than 1 then the energy storage unit has remaining useful life. The life of the energy storage units is associated with the cost of the energy storage units. Therefore, the cost of energy storage units may vary with the consumption equivalent 'C.' As noted hereinabove, the consumption equivalent is determined employing the DEQ, damage equivalent quantity. Further, DEQ is determined based on the difference values for each time slot of a dispatch window, determined at step 402. In one example, DEQ is determined based on $P_{BESS}$, which is in turn dependent on difference values for each time slot of a dispatch window. According to aspects of the present disclosure, the difference values for each time slot may depend on the forecast scheme selected from the plurality of forecast schemes at step 212 of FIG. 3. Therefore, the consumption equivalent may vary based on the forecast scheme selected. Accordingly, the cost associated with energy storage units may vary depending on the forecast scheme selected.

Moreover, a penalty to be paid to the grid is determined based on the dispatchability quantity $D_p$. As noted hereinabove, dispatchability quantity $D_p$ provides a measure of difference between the forecasted wind farm power estimate and the plant power. Therefore, the dispatchability quantity $D_p$ depends on the forecasted scheme selected from a plurality of forecast schemes at step 212 of FIG. 3. Moreover, dispatchability quantity varies with the type of dispatch regulator employed. Therefore, the penalty to be paid to the grid varies with the type of forecast scheme selected and the type of dispatch regulator employed. Accordingly, for different forecast schemes and for the different dispatch regulators, different values of penalty to be paid to the grid may be determined.

An assessment may be conducted to verify which combination of forecast scheme and dispatch regulator yields a lower overall cost, that is, the sum of the cost associated with energy storage units and the penalty to be paid to the grid. Accordingly, the forecast scheme and the dispatch regulator which yields most economical overall cost may be selected. Thus, the penalty to be paid to the grid 114 may be balanced without considerably affecting the life of the energy storage units 106.

Furthermore, the foregoing examples, demonstrations, and process steps such as those that may be performed by the system may be implemented by suitable code on a processor-based system, such as a general-purpose or special-purpose computer. It should also be noted that different implementations of the present disclosure may perform some or all of the steps described herein in different orders or substantially concurrently, that is, in parallel. Furthermore, the functions may be implemented in a variety of programming languages, including but not limited to C, C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The various embodiments of the hybrid wind system and the methods method for optimizing a hybrid wind system described hereinabove aid in improving the operation of the hybrid wind system. Furthermore, since the damage equivalent quantity (DEQ) and/or consumption equivalent 'C' corresponding to the energy storage units is continuously monitored along with determination of the dispatchability quantity $D_p$ of the plurality of wind turbines, the penalty to be paid to the grid is optimized without compromising on the life of the energy storage unit. In addition, this system and method of optimizing the hybrid wind system is economically advantageous. Specifically, the overall operational cost of the hybrid wind system may be reduced by employing this method of optimizing the hybrid wind system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A method for operating a hybrid wind system comprising a wind farm having a plurality of wind turbines and one or more energy storage units to decrease a frequency of replacement of the one or more energy storage units, the method comprising:

acquiring actual wind power data associated with one or more dispatch windows;

determining, by a processor, forecasted wind farm power estimates corresponding to the one or more dispatch windows using a plurality of forecast schemes;

computing, by the processor, difference values by comparing the forecasted wind farm power estimates to the actual wind power data;

identifying, by the processor, a wind power forecast scheme based at least in part on the computed difference values;

determining, by the processor, a damage equivalent quantity of the one or more energy storage units based at least in part on the forecasted wind farm power estimates for a dispatch window of the one or more dispatch windows determined based on the identified forecast scheme and the actual wind power data for the dispatch window of the one or more dispatch windows, wherein the damage equivalent quantity for a respective energy storage unit is given by equation:

$$DEQ = \left(\frac{1}{N_{DEQ}}\sum_{i=1}^{n} n_i S_i^m\right)^{\frac{1}{m}},$$

wherein DEQ is the damage equivalent quantity, $N_{DEQ}$ is a number of cycles of the respective energy storage units, $S_i$ is a depth of discharge, $n_i$ is a number of cycles of the depth of discharge $S_i$, and m is a slope of the depth of discharge versus number of cycles curve; and balancing, by the processor, a penalty to be paid to a grid operator with the damage equivalent quality of the one or more energy storage units while regulating the wind turbines and the one or more energy storage units based at least in part on a subsequent forecasted wind farm power estimate generated using the identified wind power forecast scheme.

2. The method of claim 1, wherein the balancing of the penalty to be paid to the grid operator with the damage equivalent quality of the one or more energy storage units comprises determining a dispatchability quantity of the wind farm and a consumption equivalent of the one or more energy storage units based at least in part on the subsequent forecasted wind farm power estimate generated using the identified wind power forecast scheme.

3. The method of claim 2, further comprising determining the cost of the one or more energy storage units based on the consumption equivalent and determining the penalty to be paid to the grid operator based on the dispatchability quantity.

4. The method of claim 1, wherein the plurality of forecast schemes comprises at least several of a persistence forecast scheme, an auto-regressive forecast scheme, a linear fitting forecast scheme, a neural network based scheme, and a support vector regression scheme.

5. The method of claim 1, wherein the actual wind power data associated with a dispatch window of the one or more dispatch windows comprises a mean of actual wind power data acquired at different time slots corresponding to the dispatch window of the one or more dispatch windows.

6. The method of claim 1, wherein balancing the penalty to be paid to the grid operator with the damage equivalent quantity of the one or more energy storage units comprises acquiring a balance between cost of the one or more energy storage units and corresponding penalty to be paid to the grid operator.

7. A hybrid wind system, comprising:
a wind farm coupled to a grid and comprising a plurality of wind turbines and one or more energy storage units;
a controller programmed for executing the steps of:
acquiring actual wind power data associated with one or more dispatch windows;
determining forecasted wind farm power estimates corresponding to the one or more dispatch windows using a plurality of forecast schemes;
computing difference values by comparing the forecasted wind farm power estimates to the actual wind power data;
identifying a wind power forecast scheme based at least in part on the computed difference values; and
balancing a penalty to be paid to a grid operator with a damage equivalent quantity of the one or more energy storage units while regulating the wind turbines and one or more energy storage units based at least in part on a subsequent forecasted wind farm power estimate generated using the identified wind power forecast scheme,
wherein the damage equivalent quantity for a respective energy storage unit is given by equation:

$$DEQ = \left(\frac{1}{N_{DEQ}}\sum_{i=1}^{n} n_i S_i^m\right)^{\frac{1}{m}},$$

wherein DEQ is the damage equivalent quantity, $N_{DEQ}$ is a number of cycles of the respective energy storage units, $S_i$ is a depth of discharge, $n_i$ is a number of cycles of the depth of discharge $S_i$, and m is a slope of the depth of discharge versus number of cycles curve.

8. The system of claim 7, wherein the one or more energy storage units comprises one or more batteries.

9. The system of claim 7, further comprising one or more transducers located proximate to the plurality of wind turbines.

10. The system of claim 7, wherein the controller comprises a sub-controller configured to determine state of charge of the one or more energy storage units.

11. A hybrid wind system, comprising:
a wind farm coupled to a grid and comprising a plurality of wind turbines, a plurality of batteries located proximate to respective ones of the plurality of wind turbines, and a plurality of transducers located proximate to the plurality of wind turbines;
a centralized controller programmed for executing the steps of:
acquiring actual wind power data associated with one or more dispatch windows;
determining forecasted wind farm power estimates corresponding to the one or more dispatch windows using a plurality of forecast schemes;
computing difference values by comparing the forecasted wind farm power estimates to the actual wind power data;
identifying a wind power forecast scheme based at least in part on the computed difference values;
determining a battery set point for one or more time slots of the one or more dispatch windows based at least in part on the subsequent forecasted wind farm power estimate generated using the identified wind power forecast scheme; and
balancing a penalty to be paid to a grid operator with a damage equivalent quantity of the plurality of batteries while regulating the wind turbines and the plurality of batteries based at least in part on a subsequent forecasted wind farm power estimate generated using the identified wind power forecast scheme, wherein the damage equivalent quantity for a respective battery is given by equation:

$$DEQ = \left(\frac{1}{N_{DEQ}} \sum_{i=1}^{n} n_i S_i^m \right)^{\frac{1}{m}},$$

wherein DEQ is the damage equivalent quantity, $N_{DEQ}$ is a number of cycles of the respective battery, $S_i$ is a depth of discharge, $n_i$ is a number of cycles of the depth of discharge $S_i$, and m is a slope of the depth of discharge versus number of cycles curve.

12. The method of claim 1, wherein balancing the penalty to be paid to the grid operator with the damage equivalent quality of the one or more energy storage units comprises reducing at least one of the penalty to be paid to the grid operator and operational cost of the hybrid wind system over a period of time.

13. The method of claim 1, wherein balancing the penalty to be paid to the grid operator with the damage equivalent quality of the one or more energy storage units comprises acquiring a balance between the cost of the one or more energy storage units and the corresponding penalty to be paid to the grid operator over a lifetime of the one or more energy storage units.

14. The method of claim 1, wherein balancing the penalty to be paid to the grid operator with the damage equivalent quality of the one or more energy storage units comprises providing power to a grid without considering life of the one or more energy storage units when requirements of the grid are stringent.

* * * * *